(12) United States Patent
Pearce et al.

(10) Patent No.: US 7,415,322 B1
(45) Date of Patent: Aug. 19, 2008

(54) MOTHERBOARD HAVING ADVANCED FAN CONTROL FEATURES

(75) Inventors: Jerry W. Pearce, Apex, NC (US); Thomas J. Clement, Raleigh, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 23 days.

(21) Appl. No.: 11/585,385

(22) Filed: Oct. 24, 2006

(51) Int. Cl.
*G06F 1/20* (2006.01)
(52) U.S. Cl. .......................... 700/300; 700/19; 700/50; 710/100; 713/300; 361/687
(58) Field of Classification Search ................. 700/19, 700/50, 300; 710/100; 713/300; 361/687, 361/701
See application file for complete search history.

(56) References Cited

U.S. PATENT DOCUMENTS

| | | | | |
|---|---|---|---|---|
| 6,487,463 B1 * | 11/2002 | Stepp, III | | 700/79 |
| 6,697,254 B1 * | 2/2004 | King et al. | | 361/687 |
| 6,725,132 B2 * | 4/2004 | Frankel et al. | | 700/300 |
| 6,813,150 B2 * | 11/2004 | King et al. | | 361/687 |
| 7,315,448 B1 * | 1/2008 | Bash et al. | | 361/701 |
| 2005/0240316 A1 * | 10/2005 | Mayer | | 700/300 |

* cited by examiner

*Primary Examiner*—Albert Decady
*Assistant Examiner*—Douglas S Lee
(74) *Attorney, Agent, or Firm*—Winstead Sechrist & Minick; Carlos Munoz-Bustamante

(57) ABSTRACT

A motherboard is capable of accepting various types of fans from same or different manufacturers and is capable identifying the type of fan to which it is connected. In one embodiment, the motherboard is capable of decoding bar code data originating from a fan of the type which, rather than including circuitry for generating a single index pulse, includes an integral optical sensor and bar code pair for generating the bar code data, the motherboard being further capable of and identifying the fan based on the bar code data. Fan identification has a variety of uses including, for example, adjusting motherboard parameters to properly operate the fan based on the type of fan presently coupled to the motherboard. Additionally, fan speed may be calculated from pulses which are intended to identify the fan.

15 Claims, 2 Drawing Sheets

MOTHERBOARD HAVING ADVANCED FAN CONTROL FEATURES

CROSS-REFERENCE TO RELATED APPLICATIONS

The present invention is related to the subject matter of the following commonly assigned, U.S. patent applications: Ser. No. 11/585,385, now issued as U.S. Pat. No. 7,319,299, entitled "Determining Types of Cooling Fans Used in a Personal Computer Thereby Using Optimum Parameters to Control Each Unique Cooling Fan" and filed 27 Jun. 2005; and Ser. No. 11/585,714 entitled "Advanced Fan Control and Identification System and Method" and filed contemporaneously herewith.

BACKGROUND OF THE INVENTION

This invention pertains to circuit boards which provide enhanced features, and, more particularly, to a motherboard which provides a platform from which detection of fan type and control therefor is made possible.

Generally, computer system motherboards provide at platform on which a computer system can be built, and soldered thereto include various Large Scale Integration (LSI) chips and sockets for Very Large Scale Integration (LSI) chips such as a processor mounted thereon. The computer system, in turn, typically includes a storage device such as a hard disk, a battery device, and input/output devices. Each of these is known to generate heat as each operates in a computer. For some electrical components, such as a processor, a temperature range is often indicated by specifications which set a temperature range indicative of satisfactory and/or optimum performance (hereinafter, as used herein, this temperature and range may also be referred to as "rated temperature"), and often one or more cooling fans are typically provided in conjunction with electrical components in a computer system to keep the temperature in the system within the rated temperature.

A computer system motherboard may include multiple processor sockets, for attachment of multiple processors at the time a computer system is manufactured, or electrical components that each need to be cooled by a different cooling fan. The speed of each of these cooling fans may be controlled by a program embedded in the system Basic Input/Output System (BIOS) code. Typically, the speed of each of these fans is controlled by a pulse width modulated signal at an input terminal of the more modern fans, and by pulsing a supply voltage to the fan in older fans. The pulse supplied to the older fans may vary based on the width, amplitude and frequency of the pulse. These characteristics (PWM input, and power supply pulse width, amplitude and frequency) may all be used to control the speed of the cooling fan.

Cooling fans may be manufactured from different manufacturers and may include different designs that each has specific PWM characteristics or, in the case of older fans, supply voltage characteristic requirements for optimum performance.

SUMMARY OF THE INVENTION

However, in light of the above and as broadly contemplated by the present invention, it is recognized herein that there is a need for motherboards to work with a variety of cooling fans. In order to control fan PWM characteristics or supply voltage for various cooling fans, the parameters or characteristics typically used are not optimum for any of the cooling fans. By not using the optimum parameters or supply voltage characteristics for any of the cooling fans, the cooling fans may be running faster than necessary or operating for a longer duration than necessary or using more power than necessary. Furthermore, the cooling fans may be operating with a greater amount of noise than necessary by not using the optimum parameters.

If, however, each particular cooling fan could be operated using the optimum parameters for that cooling fan, then the cooling fans may be operating more efficiently thereby saving power. Furthermore, the cooling fans may be operating more quietly.

Therefore, there is a need in the art to operate each unique cooling fan by using its own optimum parameters or characteristics.

Broadly contemplated herein, in accordance with at least one presently preferred embodiment of the present invention, a motherboard includes an unpopulated processor socket having processor bus signal lines for controlling processor access and for delivering processor-addressable data to other circuits on the motherboard. A memory stores instructions to be executed by a provided processor which is removably attachable to said unpopulated processor socket. Fan circuitry receives an electrical signal corresponding to coded indicia disposed on a rotatable portion of a provided fan and provides data as processor-addressable data through the processor bus signal lines of the socket. In one embodiment, this data is representative of the electrical signal. The data is preferably used in said motherboard to identify a fan characteristic. A fan-related signal is preferably used in said motherboard to perform a second function. Examples are provided herein. Broadly, the fan-related signal can be the electrical signal or the data.

According to one aspect of the present invention, a motherboard is provided which includes a memory which stores instructions, a processor which executes instructions stored in said memory, and fan circuitry. In one embodiment, the processor is a processor which is other than one which executes operating system code, which is to say, for example and not for purposes of limitation, other than the main system processor. The fan circuitry is configured to receive an electrical signal corresponding to coded indicia disposed on a rotatable portion of a provided fan, the fan circuitry being configured to provide data to said processor as processor-addressable data, the data being representative of the electrical signal. In one embodiment, the data is used in said motherboard to identify a fan characteristic; and a fan-related signal is used in said motherboard to perform a second function. In broad terms, the fan-related signal can be the electrical signal or the data.

According to another aspect of the present invention, a motherboard is provided which includes a unpopulated processor socket having processor bus signal lines for controlling processor access and for delivering processor-addressable data, a memory which stores instructions to be executed by a provided processor which is removably attachable to said unpopulated processor socket, and a bar code translator. The bar code translator is configured to receive a bar code signal corresponding to bar coded indicia disposed on a rotatable portion of a provided fan and having therein encoded at least one fan characteristic. According to one embodiment, the bar code translator provides tachometric processor-addressable resources based on the bar code signal and generates bar code data as processor-addressable data through the processor bus signal lines of said socket. The bar code data identifies one or more fan characteristics. In this embodiment, the instructions stored in the accessible memory include instructions which are effective to: read the bar code data; determine fan type; and establish a parameter which controls fan speed based on the determined fan type.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
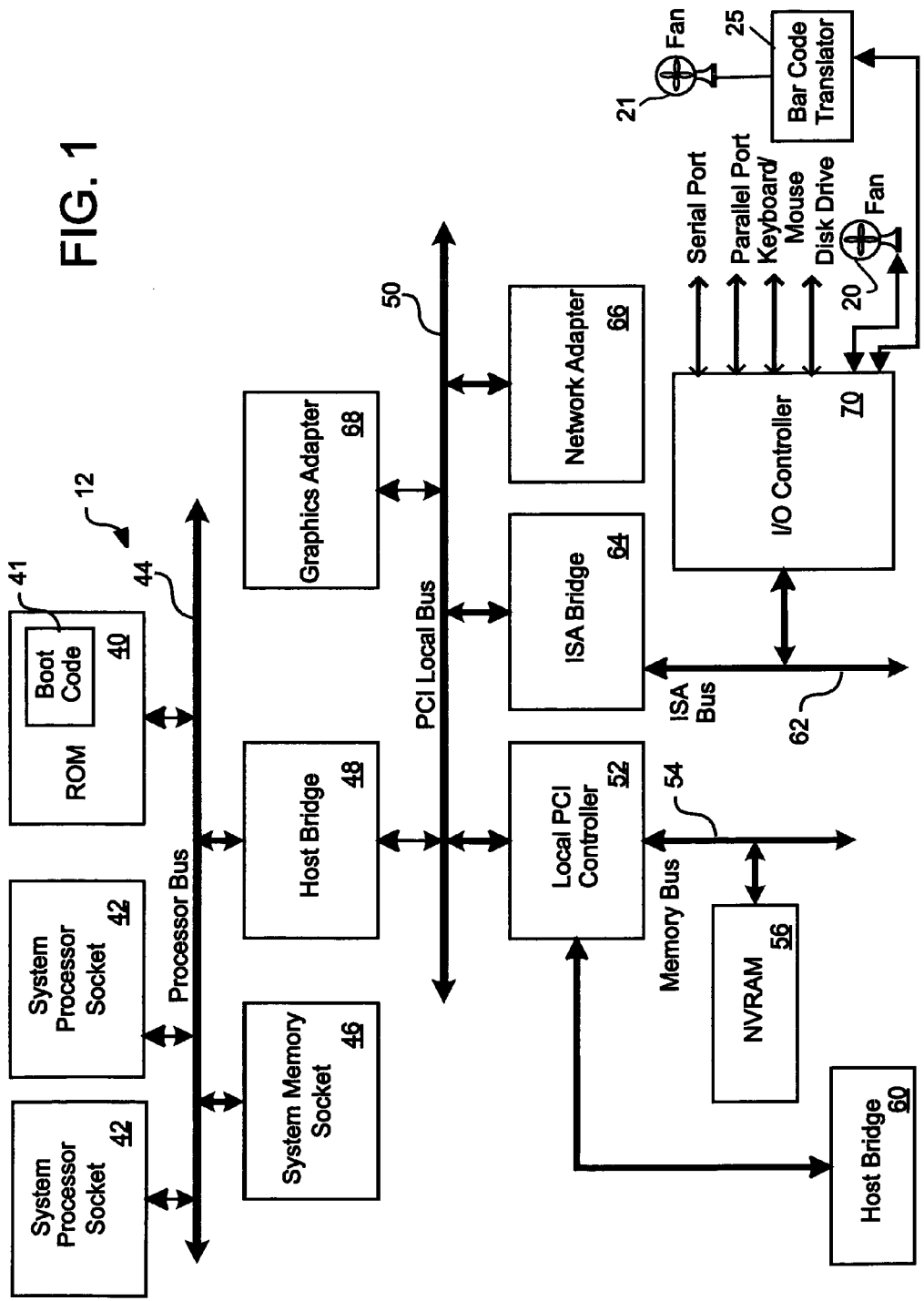
FIG. 1 is a block diagram of a motherboard according to a preferred embodiment of the present invention which supports the fan control, identification, and reporting features which are to be described.

Referring to the accompanying drawings, in which like numerals indicate like elements or steps throughout the several views, FIG. 1 is a block diagram of a motherboard according to a preferred embodiment of the present invention which incorporates the fan control, identification, and reporting features herein described.

Referring now more particularly to FIG. 1, there is depicted a block diagram of an illustrative embodiment of a motherboard 12. The non-limiting motherboard depicted in FIG. 1 may be used in the manufacture of computer systems such as desktop computer systems, for example, in one of the Think-Centre® or ThinkPad® series of personal computers sold by Lenovo (US) Inc. of Purchase, N.Y., or a workstation computer, such as the Intellistation®, which are sold by International Business Machines (IBM) Corporation of Armonk, N.Y. As will become apparent from the following description, the present invention is applicable to advanced fan control, and identification for any type of data processing system.

As shown in FIG. 1, non-limiting motherboard 12 includes at least one system processor socket 42 for removably attaching a system processor. System processor socket 42 is preferably unpopulated and includes processor bus signal pins and lines for controlling processor access and for delivering processor-addressable data. Unpopulated processor socket 42 is coupled to a Read-Only Memory (ROM) 40 and a system memory socket 46 by a processor bus 44. System memory socket 46 may be populated with memory or left unpopulated. Read-only memory 40 may also be provided as and unpopulated read-only memory socket. System processor socket 42, which may comprise one of the Sun King Technology line of zero insertion force (ZIF) sockets, is a socket for a general-purpose processor that executes boot code 41 stored within ROM 40 at power-on and thereafter processes data under the control of operating system and application software stored in system memory 46. System processor socket 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system motherboard 12 to a network (not shown) (e.g., local area network), and graphics adapter 68, which interfaces computer system motherboard 12 to a display (not shown). Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Motherboard 12 further includes Industry Standard Architecture (ISA) bus 62, which is coupled to PCI local bus 50 by ISA bridge 64. Coupled to ISA bus 62 is an input/output (I/O) controller 70, which controls communication between motherboard 12 and attachable peripheral devices such as a keyboard, mouse, and a disk drive. In addition, I/O controller 70 supports external communication by motherboard 12 via serial and parallel ports.

Figure 2:
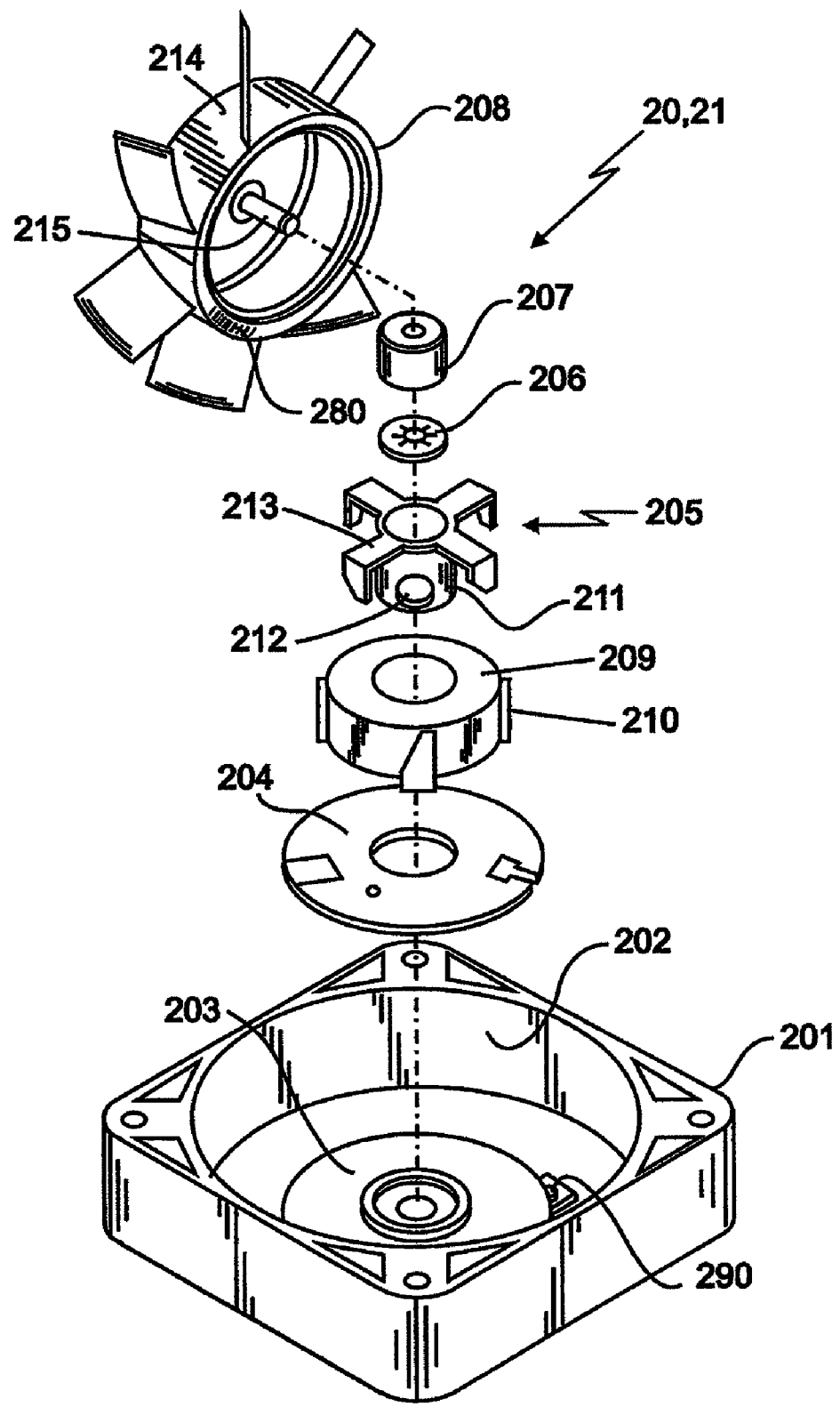
FIG. 2 illustrates the type of cooling fan which may be coupled to and supported by a motherboard in accordance with an embodiment of the present invention.

FIG. 2 illustrates the type of cooling fan which may be coupled to and supported by a motherboard in accordance with an embodiment of the present invention. Referring to FIG. 2, cooling fan 20, 21 may include a housing 201 with a circular recess 202 defined therein and a seat 203 formed at a bottom face thereof. A circuit board 204, a stator assembly 205, a collar 206, a self-lubricating bearing 207 and a rotor 208 are in turn coaxially mounted in recess 202 of housing 201.

Circuit board 204 is secured on seat 203 of housing 201. Stator assembly 205 has a coil 209 with an opening (not shown) and is fixedly mounted on circuit board 204 by a bracket 210 provided beneath coil 209. A sleeve 211, of which a first end is enclosed, is received in the opening of coil 209. Sleeve 211 has an external dome 212 formed at the first end thereof. A fastener 213 composed of a plurality of wings (not shown) is integrally formed with a second end of sleeve 211, wherein the wings each comprise a laterally extended arm (not shown) and a finger (not shown) perpendicularly extended from a distal edge of the arm and toward the first end of sleeve 211. The arms of the wings are engaged with a top face of coil 209 and the fingers of the wings are engaged with an outer circumference of coil 209 to fasten sleeve 211 on coil 209.

Collar 206 defines an aperture (not shown) and is provided on a bottom face of sleeve 211. The self-lubricating bearing 207 is received and secured in sleeve 211 and placed upon collar 206.

Rotor 208 includes coded indicia 280 in the form of a bar-code label disposed on rotating hub 214. Persons of ordinary skill in the art will readily recognize alternative placements for bar-code label 280. Each cooling fan 20, 21 may include a different barcode label placed on rotating hub 214 thereby allowing different cooling fans 20, 21 to be identified as explained in further detail below.

Rotor 208 may further include a core 215 formed at the center thereof. Core 215 has a head formed at a distal end thereof. Core 215 is secured in self-lubricating bearing 207 and the head of core 215 is inserted through collar 206 and received in dome 212.

Cooling fan 20, 21 includes an integral optical sensor 290 placed at a fixed location in fan housing 201. For example, optical sensor 290 may be placed along the outer rim of seat 203 at the base of housing 201 and in-line with the barcode label 280. To provide guidance to the artisan, and not for purposes of limitation, sensor 290 may be an Agilent Technologies HBCS-1100 High Resolution Optical Reflective Sensor (or the like); information for which can be found at the Agilent web site. Sensor 290 may be configured to detect the passing of the coded indicia 280, the barcode label, placed on rotating hub 214 as cooling fan 20, 21 rotates as discussed above. Sensor 290 may further be configured to generate a sequence of pulses corresponding to the detected indicia 280. This generated pulse signal may be transmitted by sensor 290 to the processor bus signal lines of socket 42 via I/O controller 70 as will be described in further detail. A processor provided on the motherboard 12 via system processor socket 42, or an included processor, may determine a particular type of cooling fan for cooling fan 20, 21 based on the generated pulse signal. In an embodiment employing an included processor which is other than the main processor which executes operating system code, such as a micro controller soldered directly to the motherboard (not separately shown although I/O controller 70 could embody this structure and function), such micro controller would include an instruction code memory or have access to a non volatile memory, such as NVRAM 56, from which to execute instructions to perform the described functions. Once the provided or included processor determines the particular cooling-fan type, it establishes particular control parameters set for that particular type of cooling fan to control cooling fan 20, 21 so that it operates optimally. Depending on the type of fan, the parameters can control, for example and not for the purposes of limitation, a voltage level which controls the fan's speed, or a pulse width modulation signal which controls the fan's speed.

It is noted that cooling fan 20, 21 may include elements which are different than those presented herein and that FIG. 2 is illustrative of a sample embodiment of cooling fan 20, 21. It is further noted that the present invention is not to be limited in scope to any particular embodiment, including the embodiment discussed herein, but rather is to include the principles discussed herein.

Returning to FIG. 1, there depicted are two fans 20, 21 of the type shown and described in FIG. 2 and each of which are to be mechanically arranged so as to move air in the vicinity of each of the two system processor sockets 42. When fans 20, 21 are eventually installed, it is preferable to arrange the fans so as to blow air across the fins of a heat sink (not shown) which is thermally coupled to one or more of the processors which are to be provided on system processor sockets 42.

Two embodiments are shown in FIG. 1. In one embodiment, optical sensor 290 of provided fan 21 is coupled to bar code translator 25, which in turn is coupled to I/O controller 70. In this embodiment, barcode translator 25 is based on any of a variety of industry-standard parts and is utilized to directly read the optical signal pulses emitted by the optical sensor 290 of fan 21. Fixed optical sensor 290 reads bar coded indicia 280, which is disposed on rotating hub 214, and generates an electrical signal corresponding to the coded indicia. Those skilled in the art may implement barcode translator 25 by combining functions described herein with macros from industry standard barcode translators such as National Semiconductor LM93, LM85, or the like. The artisan is directed to, for example, Application Brief 114 entitled "*Autonomous Fan Control For Processor Systems Using The LM*85," as published by National Semiconductor. Barcode translator 25 directly decodes the optical signals and generates parallel barcode data, in byte or word form, which is then made available to I/O controller 70. This parallel barcode data is representative of the electrical signal generated by the optical sensor of the fan and is made available to the processor bus signal lines of socket 42 via I/O controller 70 as processor-accessible or processor-addressable data.

In one embodiment, non-limiting optical sensor 290 of fan 20 is to be coupled directly to I/O controller 70 for direct serial access by a provided processor coupled through system processor socket 42 of the embodiment. In this embodiment, a provided processor coupled through the processor bus signal lines of socket 42 directly serially reads the optical signal pulses emitted by optical sensor 290 of fan 20 according to well-known methods such as bit polling. Once the data is made available to the provided processor, well-known methods such as those used by bar code translator 25 may be used to decode the coded data. Details concerning the decoding of bar coded data, as performed by industry standard parts, are well known in the art and are omitted so as to not obfuscate the present disclosure in unnecessary detail. Although processor intensive, this embodiment provides a low-cost and minimal part count solution to a system assembler using the motherboard 12 of the embodiment.

As described in these non-limiting embodiments, therefore, the fan signals can be picked up directly by a provided processor coupled through the processor bus signal pins/lines of socket 42 as an electrical signal, in the case of a serial-bit-polling embodiment wherein the electrical signal emitted by the optical sensor 290 is read directly, or indirectly as data, in the case where data is read in parallel as provided by barcode translator 25 via I/O controller 70.

In a system assembled from the motherboard of the embodiments, it is preferable to read the optical indicia, in order to obtain the fan specific data, once each time the system is started from cold so that the fan may be operated at a speed which is optimal for the reading of the barcode data. The optimal speed for reading the barcode data from the fan is slower than expected fan speeds while the system is running hot. Additionally or alternatively, system temperature can be taken into account when a decision is to be made as to whether to operate the fan at a slower speed in order to read the optical indicia. If the system temperature is high, the reading may be bypassed.

For the benefit of the system assembler, when utilizing the motherboard of any of the embodiments, the decoded data may contain data of fine granularity as encoded by barcode label 280 and may include manufacturer data, fan type, fan part number, lot number, fan serial number, etc. This data may be used in a variety of different circumstances including the setting of particular control parameters which correspond to the type of cooling fan to be used, or the exact model number as the case may be, to optimally control cooling the fan or fans. For this purpose, for example to determine the fan type, an inventory program may be executed and may include a table which may be stored in a non-volatile memory, or downloaded from the Internet, which gives optimal parameters which correspond to any of the decoded data. For example, the control parameters may include parameters which control the speed of fan 20, 21 based on the determined fan type or part number. The parameters can then be established in the system to control the speed of the fan based on the determined fan type or part number. The table may be implemented as a lookup table with the coded signal or the coded data being used as a table reference for selecting the fan type.

In addition to establishing optimal control parameters for fan 20, 21, the electrical signal emitted by optical sensor 290 may also be used to perform a second function. For example, in non-limiting embodiments the electrical pulses emitted by optical sensor 290, which correspond to the bar coded indicia, may also be used to provide a tachometer function. Thus, the electrical pulses emitted by optical sensor 290 may be processed through an integrator, whether it be a hardware- or software-implemented integrator, to give the equivalent of an index pulse from which the speed of the fan can be derived in real time. It is expected however that no integrator may be needed while taking tachometric readings at high speed, that is the speed which is expected for the fan's cooling function while the system is running hot, since at high speed any detected edge may serve this purpose.

In some embodiments, this tachometric function is preferably built into barcode translator 25 such that tachometric data is precalculated and provided by barcode translator 25 as tachometric data stored in a register of bar code translator 25, such register could be addressed/read directly through the processor bus signal lines of socket 42 through I/O controller 70. However, the present invention is not to be limited in scope to any given embodiment. As alternatives, the tachometer signal may be taken by a provided system processor which is coupled through the processor bus signal lines of socket 42 and I/O controller 70 in any form and calculated directly; it also may be calculated as a function of the frequency by which barcode translator 25 routinely reports each decode.

The description returns now to the secondary function of the fan related signals. As a further example of using any of the fan related signals, whether they be electrical signals directly read off of the fan 20 or indirectly via fan 21 through barcode translator 25, for performing a second function by the motherboard, the decoded data may be transferred over a network via network adapter 66 by a provided processor in a system assembled using the motherboards described herein to report the fan type, or any other information, to an entity which is other than the assembled system. The transfer may be to a server or an administrator across the network and transferred for the purpose of reporting any of the fan parameters including model number, manufacturer, etc. This information can be used for quality control purposes, as in, for example, where it is knowing that a particular type of fan is having quality control problems, the existence of a particular type of fan being used in a system may be thus reported and the administrator may order new parts for replacement. Likewise, similar reporting and replacement can be made by lot number or even by a serial number range.

In the drawings and specifications there has been set forth a preferred embodiment of the invention and, although specific terms are used, the description thus given uses terminology in a generic and descriptive sense only and not for purposes of limitation.

What is claimed is:

1. A motherboard comprising:
    an unpopulated processor socket having processor bus signal lines for controlling processor access and for delivering processor-addressable data;
    a memory which stores instructions to be executed by a provided processor which is removably attachable to said unpopulated processor socket;
    fan circuitry which receives an electrical signal corresponding to coded indicia disposed on a rotatable portion of a provided fan and which provides data as processor-addressable data through the processor bus signal lines of said socket, the data being representative of the electrical signal;
    wherein,
        the data is used in said motherboard to identify a fan characteristic, and
        a fan-related signal is used in said motherboard to perform a second function, the fan-related signal being selected from the group consisting of the electrical signal and the data.

2. A motherboard according to claim 1 wherein a parameter which controls fan speed is established as a function of the data.

3. A motherboard according to claim 2 wherein the second function is a tachometric function which derives fan speed from the fan-related signal.

4. A motherboard according to claim 2 wherein said fan circuitry generates a signal to regulate fan speed at a predetermined speed while receiving the electrical signal corresponding to coded indicia, the predetermined speed being slower than a nominal fan speed.

5. A motherboard according to claim 2 wherein the instructions stored in said memory include instruction to identify the fan characteristic by decoding the data.

6. A motherboard according to claim 2 wherein said fan circuitry further includes:
    a register which is processor addressable; and
    a translator which decodes the electrical signal and generates the data as decoded data which identifies the fan characteristic and stores the data in said register as processor-addressable data.

7. A motherboard comprising:
    a memory which stores instructions;
    a processor which executes instructions stored in said memory, the processor being a processor other than one which executes operating system code;
    fan circuitry which receives an electrical signal corresponding to coded indicia disposed on a rotatable portion of a provided fan, the fan circuitry being configured to provide data to said processor as processor-addressable data, the data being representative of the electrical signal;
    wherein,
        the data is used in said motherboard to identify a fan characteristic, and
        a fan-related signal is used in said motherboard to perform a second function, the fan-related signal being selected from the group consisting of the electrical signal and the data.

8. A motherboard according to claim 7 wherein a parameter which controls fan speed is established as a function of the data.

9. A motherboard according to claim 8 wherein the second function is a tachometric function which derives fan speed from the fan-related signal.

10. A motherboard according to claim 8 wherein said fan circuitry generates a signal to regulate fan speed at a predetermined speed while receiving the electrical signal corresponding to coded indicia, the predetermined speed being slower than a nominal fan speed.

11. A motherboard according to claim 8 wherein said processor executes instructions stored in said memory which are effective to identify the characteristic of said fan by decoding the data.

12. A motherboard according to claim 8 wherein the fan circuitry further includes:
    a register which is addressable by said processor; and a translator which decodes the electrical signal and generates the data as decoded data which identifies the characteristic of said fan and stores the data in said register for access by said processor.

13. A motherboard comprising:

an unpopulated processor socket having processor bus signal lines for controlling processor access and for delivering processor-addressable data;

a memory which stores instructions to be executed by a provided processor which is removably attachable to said unpopulated processor socket;

a bar code translator which receives a bar code signal corresponding to bar coded indicia disposed on a rotatable portion of a provided fan and having therein encoded at least one fan characteristic, wherein the bar code translator provides tachometric processor-addressable resources based on the bar code signal, generates bar code data as processor-addressable data through the processor bus signal lines of said socket, the bar code data identifying one or more fan characteristics;

wherein the instructions stored in the accessible memory include instructions which are effective to:

read the bar code data;

determine fan type; and establish a parameter which controls fan speed based on the determined fan type.

14. A motherboard according to claim 13 wherein the tachometric resources are selected from the group consisting of a tachometer signal and tachometric data stored in a register of said bar code translator.

15. A motherboard according to claim 14 wherein said bar code translator generates a signal to regulate fan speed at a predetermined speed while receiving the bar code signal corresponding to the bar coded indicia to thereafter generate the bar code data identifying one or more fan characteristics, the predetermined speed being slower than a nominal fan speed.

* * * * *